United States Patent
Schliwa-Bertling et al.

(10) Patent No.: US 10,939,373 B2
(45) Date of Patent: Mar. 2, 2021

(54) METHOD FOR ENHANCED POWER SAVING MODE FOR A WIRELESS DEVICE

(71) Applicant: Telefonaktiebolaget LM Ericsson (publ), Stockholm (SE)

(72) Inventors: Paul Schliwa-Bertling, Ljungsbro (SE); Peter Hedman, Helsingborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 268 days.

(21) Appl. No.: 15/524,946

(22) PCT Filed: Nov. 6, 2015

(86) PCT No.: PCT/SE2015/051174
§ 371 (c)(1),
(2) Date: May 5, 2017

(87) PCT Pub. No.: WO2016/072923
PCT Pub. Date: May 12, 2016

(65) Prior Publication Data
US 2017/0347315 A1 Nov. 30, 2017

Related U.S. Application Data

(60) Provisional application No. 62/077,102, filed on Nov. 7, 2014.

(51) Int. Cl.
*H04W 52/02* (2009.01)
*H04W 76/30* (2018.01)
(Continued)

(52) U.S. Cl.
CPC ......... *H04W 52/0216* (2013.01); *H04W 8/24* (2013.01); *H04W 52/0219* (2013.01);
(Continued)

(58) Field of Classification Search
None
See application file for complete search history.

(56) References Cited

U.S. PATENT DOCUMENTS 10,117,180 B2 * 10/2018 Martin .................. H04W 76/28
10,693,613 B2 * 6/2020 Kahtava ............... H04L 5/0055
(Continued)

FOREIGN PATENT DOCUMENTS

| CN | 101651978 A | 2/2010 |
| CN | 102487541 A | 6/2012 |
| CN | 103686955 A | 3/2014 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.3.0, Sep. 2014, 1-378.
(Continued)

*Primary Examiner* — Donald L Mills
(74) *Attorney, Agent, or Firm* — Murphy, Bilak & Homiller, PLLC

(57) ABSTRACT

A method of operating a wireless device in a radio access network may be provided where an active time is defined for monitoring of downlink transmissions in an idle state following a connected state. The method may include providing wireless communication with the radio access network in a connected state. A disconnect message may be received including an indication to disable monitoring of downlink transmissions in the idle state. Responsive to receiving the disconnect message including the indication to disable monitoring of downlink transmissions in the idle state, a power saving mode for the wireless device may be initiated without waiting a duration of the active time after receiving the disconnect message.

41 Claims, 13 Drawing Sheets

(51) Int. Cl.
*H04W 8/24* (2009.01)
*H04W 76/27* (2018.01)
*H04W 28/02* (2009.01)

(52) U.S. Cl.
CPC ....... *H04W 52/0274* (2013.01); *H04W 76/30* (2018.02); *H04W 28/0221* (2013.01); *H04W 76/27* (2018.02); *Y02D 30/70* (2020.08)

(56) References Cited

U.S. PATENT DOCUMENTS

| | | | |
|---|---|---|---|
| 2009/0149162 A1* | 6/2009 | Tenny | H04W 76/20 455/414.1 |
| 2011/0182193 A1* | 7/2011 | Dwyer | H04W 72/04 370/252 |
| 2011/0199905 A1* | 8/2011 | Pinheiro | H04W 28/0215 370/235 |
| 2011/0269463 A1* | 11/2011 | Wang | H04W 52/0232 455/436 |
| 2012/0008551 A1* | 1/2012 | Giaretta | H04W 36/0011 370/328 |
| 2012/0257559 A1 | 10/2012 | Kim et al. | |
| 2012/0270547 A1* | 10/2012 | Long | H04W 60/02 455/435.1 |
| 2012/0281566 A1 | 11/2012 | Pelletier et al. | |
| 2012/0287815 A1* | 11/2012 | Attar | H04B 7/0871 370/253 |
| 2012/0307703 A1* | 12/2012 | Young | H04W 72/02 370/311 |
| 2013/0166701 A1* | 6/2013 | Todorov | H04L 67/34 709/220 |
| 2014/0126441 A1* | 5/2014 | Rai | H04W 52/0216 370/311 |
| 2016/0088559 A1* | 3/2016 | Koc | H04W 52/04 370/311 |
| 2016/0100362 A1* | 4/2016 | Palanisamy | H04W 52/0212 370/311 |
| 2016/0277921 A1* | 9/2016 | Pinheiro | H04W 64/00 |
| 2016/0302153 A1* | 10/2016 | Martin | H04W 76/28 |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.3.0, Sep. 2014, 1-290.

3GPP, "3rd Generation Partnership Project; Technical Specification Group Services and System Aspects; Architecture enhancements to facilitate communications with packet data networks and applications (Release 12)", 3GPP TS 23.682 V12.2.0, Jun. 2014, 1-32.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.0.0, Sep. 2014, 1-308.

3GPP, "3rd Generation Partnership Project; Technical Specification Group Services and System Aspects; General Packet Radio Service (GPRS); Service description; Stage 2 (Release 13)", 3GPP TS 23.060 V13.0.0, Sep. 2014, 1-350.

Unknown, Author, "Efficient use of Power Saving Mode", 3GPP TSG-RAN WG2#87, R2-143226, Dresden, Germany, Aug. 18-22, 2014, 1-2.

Unknown, Author, "LS on enabling return into PSM for UMTS", 3GPP TSG RAN WG2 #91, R2-153903, Beijing, China, Aug. 24-28, 2015, 1-1.

Unknown, Author, "PSM Enhancement", SA WG2 Meeting #106, S2-144263, San Francisco, USA, Nov. 17-21, 2014, 1-3.

Unknown, Author, "Clarifications for Power Savings Mode", InterDiaital, Change Request, SA WG2 Meeting #102, S2-141460, St. Julian's, Malta, Mar. 24-28, 2014, 1-2.

* cited by examiner

Figure 5A

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Tracking area update accept message identity | Message type 9.8 | M | V | 1 |
| | EPS update result | EPS update result 9.9.3.13 | M | V | 1/2 |
| | Spare half octet | Spare half octet 9.9.2.9 | M | V | 1/2 |
| 5A | T3412 value | GPRS timer 9.9.3.16 | O | TV | 2 |
| 50 | GUTI | EPS mobile identity 9.9.3.12 | O | TLV | 13 |

Figure 5B

| IEI | Information Element | Type/Reference | Presence | Format | Length |
|---|---|---|---|---|---|
| | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |

Figure 5C

| IEI | Information Element | Type/Reference | Presence | Format | Length |
|---|---|---|---|---|---|
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| | *Active Time Support* | | O | | |

Figure 6A

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 .. <maxnoofE-RABs> | | | EACH | reject |
| >>E-RAB ID | M | | 9.2.1.2 | | – | |
| >>E-RAB Level QoS Parameters | M | | 9.2.1.15 | Includes necessary QoS parameters. | – | |

Figure 6B

| IE/Group Name | Presence | Range | IE type and reference | Semantics description | Criticality | Assigned Criticality |
|---|---|---|---|---|---|---|
| >>Transport Layer Address | M | | 9.2.2.1 | | - | |
| >>GTP-TEID | M | | 9.2.2.2 | | - | |
| >>NAS-PDU | O | | 9.2.3.5 | | - | |
| >>Correlation ID | O | | 9.2.1.80 | | YES | ignore |
| >>SIPTO Correlation ID | O | | Correlation ID 9.2.1.80 | | YES | ignore |
| UE Security Capabilities | M | | 9.2.1.40 | | YES | reject |
| Security Key | M | | 9.2.1.41 | The KeNB is provided after the key-generation in the MME, see TS 33.401 [15]. | YES | reject |
| Trace Activation | O | | 9.2.1.4 | | YES | ignore |

Figure 6C

| IE/Group Name | Presence | Range | IE type and reference | Semantics description | Criticality | Assigned Criticality |
|---|---|---|---|---|---|---|
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |

Figure 6D

| IE/Group Name | Presence | Range | IE type and reference | Semantics description | Criticality | Assigned Criticality |
|---|---|---|---|---|---|---|
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |
| Additional CS Fallback Indicator | C-ifCSFBhighpriority | | 9.2.3.37 | | YES | ignore |
| Masked IMEISV | O | | 9.2.3.38 | | YES | ignore |
| Expected UE Behaviour | O | | 9.2.1.96 | | YES | ignore |
| *Active Time Support* | *O* | | | | *YES* | *ignore* |

METHOD FOR ENHANCED POWER SAVING MODE FOR A WIRELESS DEVICE

BACKGROUND

The present disclosure relates generally to wireless communications, and more particularly, to disconnect messages for communications between wireless terminals and base stations.

A new feature, Power Saving Mode (PSM), has been introduced in 3GPP Rel-12. It is described generally in TS 23.682 V12.2.0 (2014-06) entitled "Architecture Enhancements To Facilitate Communications With Packet Data Networks And Applications [http://www.3gpp.org/DynaReport/23682.htm] subclause 4.5.4, for LTE in TS 23.401 V13.0.0 (2014-09) entitled "General Packet Radio Service (GPRS) Enhancements For Evolved Universal Terrestrial Radio Access Network (E-UTRAN) Access"[http://www.3gpp.org/DynaReport/23401.htm] clause 4.3.22 and for 2G/3G in TS 23.060 V13.0.0 (2014-09) entitled "General Packet Radio Service (GPRS); Service Description" [http://www.3gpp.org/DynaReport/23060.htm] subclause 5.3.20. The feature is intended for battery powered machine-to-machine (M2M) devices or Internet-of-Things (IoT) devices.

PSM is basically that the wireless device switches off its radio part to save power when it has nothing to send. It will then of course become unreachable, but that is not a problem for many M2M scenarios as these are often based on Mobile Originated (MO) communication and any Mobile Terminated (MT) communication is usually not time critical. That is, if a MT communication is requested, it is ok to wait a shorter or longer time before the M2M wireless device responds. To allow this type of "delayed" MT communication, the wireless device waits before switching off its radio for some time (e.g., 10 seconds) every time it has communicated with the network (for example, uplink data or signaling, e.g., TAU/RAU with the network). The time the wireless device waits before switching off its radio is called active time.

The procedure for PSM is initiated if a device requests an active time when it is sending a TAU/RAU request. If the network accepts the PSM request, it returns an active time to the device. The returned active time may be the same as the device requested, or it may some other time that the network decides. The standard does not specify how the network (e.g., MME/SGSN) decides what active time to use. Every time the wireless device has been communicating with the network, it switches off its radio when a timer set to the active time it received from the network expires. By keeping the radio on during the active time, however, energy consumption may be increased thereby increasing drain on the battery.

SUMMARY

According to some embodiments of inventive concepts, a method of operating a wireless device in a radio access network may be provided where an active time is defined for monitoring of downlink transmissions in an idle state following a connected state. The method may include providing wireless communication with the radio access network in a connected state, and receiving a disconnect message including an indication to disable monitoring of downlink transmissions in the idle state. Responsive to receiving the disconnect message including the indication to disable monitoring of downlink transmissions in the idle state, a power saving mode for the wireless device may be initiated without waiting a duration of the active time after receiving the disconnect message.

By allowing the wireless device to initiate the power saving mode without waiting a duration of an active time after receiving a disconnect message, energy consumption may be reduced, thereby increasing battery life.

The connected state may be a first connected state, and the disconnect message may be a first disconnect message. In addition, wireless communication may be provided with the radio access network in a second connected state, and a second disconnect message may be received without an indication to disable monitoring of downlink transmissions in the idle state. Responsive to receiving the second disconnect message, the wireless device may monitor for downlink communications from the radio access network in an idle state for a duration of the active time after receiving the second disconnect message, and responsive to expiration of the duration of the active time, the power saving mode may be initiated for the wireless device.

Providing wireless communication with the radio access network in the second connected state may include providing wireless communication with the radio access network in the second connected state after initiating the power saving mode. The first and second connected states may be respective first and second Radio Resource Control connected states. The idle state may include a Radio Resource Control idle state. Monitoring for downlink transmissions in the idle state may include monitoring with an access stratum radio receiver chain of the wireless device turned on, and initiating the power saving mode may include turning the access stratum radio receiver chain of the wireless device off.

Initiating the power saving mode without waiting a duration of the active time may include turning off an access stratum receiver chain of the wireless device.

Initiating the power saving mode without waiting a duration of the active time may include turning off an access stratum receiver chain of the wireless device immediately.

The disconnect message may include a Routing Area Update accept message including the indication to disable monitoring of downlink transmissions as an Active Time Support Information Element.

The disconnect message may include a Tracking Area Update accept message including the indication to disable monitoring of downlink transmissions as an Active Time Support Information Element.

The disconnect message may include an Attach Accept message including the indication to disable monitoring of downlink transmissions as an Active Time Support Information Element.

The disconnect message may include a Radio Resource Control Connection Release message including the indication to disable monitoring of downlink transmissions as an Active Time Support Information Element.

Initiating the power saving mode may include switching a receiver of the wireless device off.

The disconnect message may be received while in the connected state.

The connected state may be a Radio Resource Control connected state.

In addition, the active time may be received from the radio access network.

According to some other embodiments of inventive concepts, a wireless device may be provided in a radio access network, and an active time may be defined for monitoring of downlink transmissions in an idle state following a connected state. More particularly, the wireless device may be adapted to provide wireless communication with the radio access network in a connected state, and to receive a disconnect message including an indication to disable monitoring of downlink transmissions in the idle state. In addition, the wireless device may be adapted to initiate a power saving mode for the wireless device without waiting a duration of the active time after receiving the disconnect message responsive to receiving the disconnect message including the indication to disable monitoring of downlink transmissions in the idle state.

According to still other embodiments of inventive concepts, a wireless device may be configured to operate in a radio access network where an active time is defined for monitoring of downlink transmissions in an idle state following a connected state. The wireless device may include a transceiver including a transmitter and receiver configured to provide wireless communications between the wireless device and a radio access network, and a processor coupled with the transceiver. More particularly, the processor may be configured to provide wireless communication with the radio access network through the transceiver in a connected state, and to receive a disconnect message through the transceiver with the disconnect message including an indication to disable monitoring of downlink transmissions in the idle state. In addition, the processor may be configured to initiate a power saving mode for the wireless device without waiting a duration of the active time after receiving the disconnect message responsive to receiving the disconnect message including the indication to disable monitoring of downlink transmissions in the idle state.

According to yet other embodiments of inventive concepts, a method may be provided to operate a node of a communication network providing communication service for a wireless device. The method may include providing wireless communication with the wireless device in a connected state, and transmitting a disconnect message for the wireless device. More particularly, the disconnect message may include an indication for the wireless device to disable monitoring of downlink transmissions in an idle state.

The connected state may be a first connected state, and the disconnect message may be a first disconnect message. In addition, wireless communication may be provided with the wireless device in a second connected state, and a second disconnect message may be transmitted to the wireless device wherein the second disconnect message is without an indication for the wireless device to disable monitoring. After transmitting the second disconnect message, a downlink communication may be transmitted to the wireless terminal within an active time defined for the wireless device to monitor downlink transmission in an idle state following a connected state.

Providing wireless communication in the second connected state may include providing wireless communication in the second connected state after transmitting the first disconnect message. The first and second connected states may include respective first and second Radio Resource Control connected states.

The idle state may be a Radio Resource Control idle state.

The disconnect message may be a Routing Area Update accept message including the indication to disable monitoring of downlink transmissions as an Active Time Support Information Element.

The disconnect message may include a Tracking Area Update accept message including the indication to disable monitoring of downlink transmissions as an Active Time Support Information Element.

The disconnect message may include an Attach Accept message including the indication to disable monitoring of downlink transmissions as an Active Time Support Information Element.

The node may be a core network node, with the core network node being coupled with the wireless device through a base station, and the disconnect message may be transmitted from the core network node through the base station to the wireless device.

The disconnect message may include an S1AP UE Context Setup Request message including an indication for the wireless device to disable monitoring of downlink transmissions in an idle state.

The node may include a core network node, and the core network node may be coupled with the wireless device through a base station. Moreover, the S1AP UE Context Setup Request message including the indication for the wireless device to disable monitoring may be transmitted from the core network node to the base station.

The node may be a base station. Moreover, transmitting the disconnect message may include receiving an S1AP UE Context Setup Request message with an indication for the wireless device to disable monitoring wherein the S1AP UE Context Setup Request message is received from a core network node, and responsive to receiving the S1AP UE Context Setup Request Message, transmitting a Radio Resource Control Connection Release message to the wireless device with an indication for the wireless device to disable monitoring.

The node may be a base station. Moreover, transmitting the disconnect message may include receiving a first message from a core network node with an indication for the wireless device to disable monitoring, and responsive to receiving the first message from the core network node, transmitting a second message to the wireless device with an indication for the wireless device to disable monitoring.

The disconnect message may be transmitted while in the connected state.

The disconnect message may be transmitted to the wireless device while in the connected state.

The connected state may be a Radio Resource Control Connected state.

Before transmitting the disconnect message, an active time may be transmitted to the wireless device with the active time defining a duration of monitoring for downlink communications in an idle state.

According to more embodiments of inventive concepts, a node of a communication network may be configured to provide communication service for a wireless device. The node may be adapted to provide wireless communication with the wireless device in a connected state, and to transmit a disconnect message for the wireless device. More particularly, the disconnect message may include an indication for the wireless device to disable monitoring of downlink transmissions in an idle state.

According to still more embodiments of inventive concepts, a core network of a communication network may provide communication service for a wireless device. The core network node may include a network interface configured to provide communication between the core network node and a base station of a radio access network, and a processor coupled with the network interface. The processor may be configured to provide wireless communication through the network interface with the wireless device in a connected state, and to transmit a disconnect message for the wireless device through the network interface. More particularly, the disconnect message may include an indication for the wireless device to disable monitoring of downlink transmissions in an idle state.

According to yet more embodiments of inventive concepts, a base station of a communication network may provide communication service for a wireless device. The base station may include a network interface configured to provide communication between the base station and a core network node, a transceiver configured to provide communication between the base station and the wireless device, and a processor coupled with the network interface and the transceiver. The processor may be configured to provide wireless communication with the wireless device through the transceiver in a connected state, and to transmit a disconnect message for the wireless device through the transceiver. The disconnect message may include an indication for the wireless device to disable monitoring of downlink transmissions in an idle state.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 5A, 5B, and 5C are diagrams illustrating an enhanced tracking area update accept message according to some embodiments of inventive concepts;

FIGS. 6A, 6B, 6C, and 6D are diagrams illustrating a modified initial UE context setup request message according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN (Radio Access Network) that communicates over radio communication channels with wireless terminals (also referred to as UEs). It will be understood, however, that inventive concepts are not limited to such embodiments and may be embodied generally in any type of communication network. As used herein, a legacy or non-legacy wireless device (also referred to as a UE, user equipment node, mobile terminal, wireless terminal, etc.) can include any device that receives data from and/or transmits data to a communication network, and may include, but is not limited to, a mobile telephone ("cellular" telephone), laptop/portable computer, pocket computer, hand-held computer, an M2M device IoT device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station, eNB, etc.) and UE (also referred to as a wireless terminal, mobile terminal, etc.) should be considering non-limiting.

Figure 1:
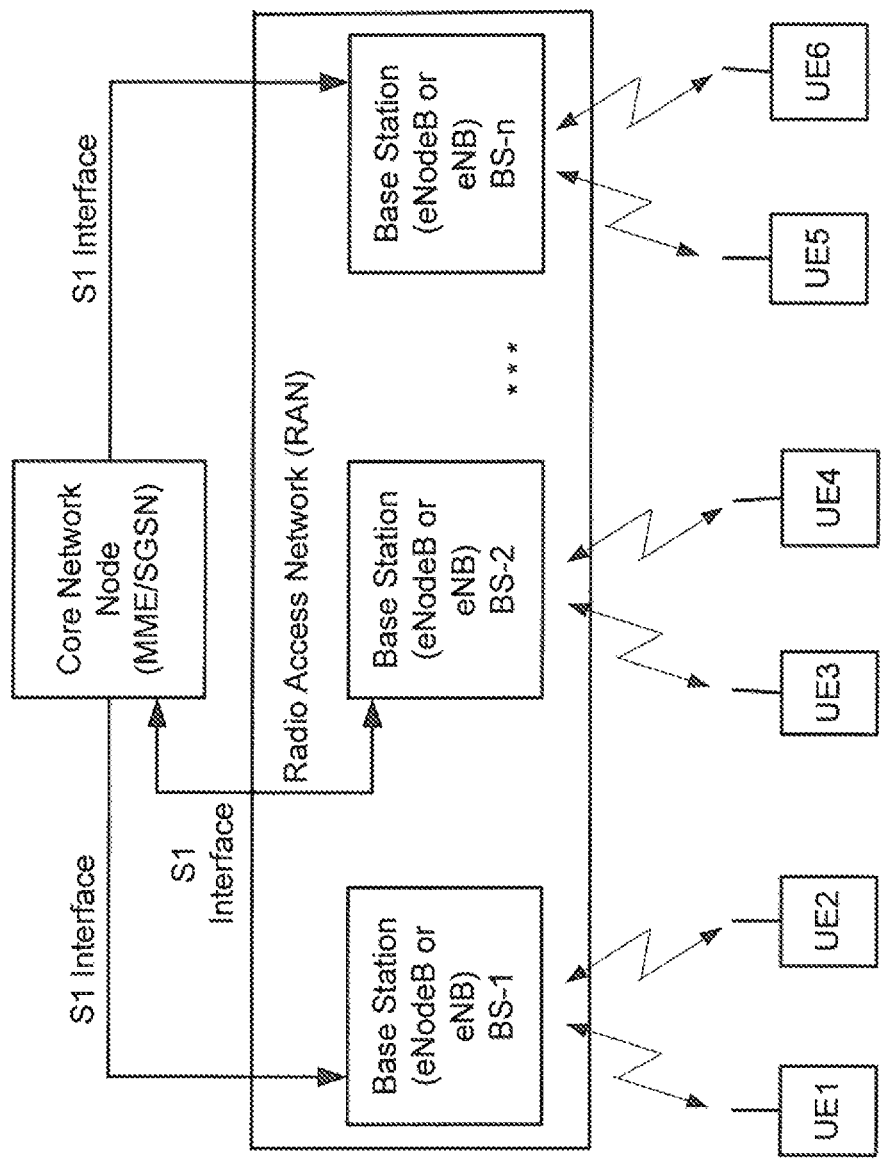
FIG. 1 is a block diagram illustrating a radio access network, a core network node, and a plurality of wireless devices according to some embodiments of inventive concepts.

FIG. 1 is a block diagram illustrating a Radio Access Network (RAN) according to some embodiments of present inventive concepts. As shown, communications between base stations and one or more core network nodes (e.g., Mobility Management Entity MME or Service GPRS Support Node SGSN) may be provided using respective S1 interfaces. Each base station BS may communicate over a radio interface (including uplinks and downlinks) with respective wireless terminals UEs in a respective cell or cells supported by the base station. By way of example, base station BS-1 is shown in communication with wireless terminals UE-1 and UE-2, base station BS-2 is shown in communication with wireless terminals UE-3 and UE-4, and base station BS-n is shown in communication with wireless terminals UE-5 and UE-6.

Figure 2:
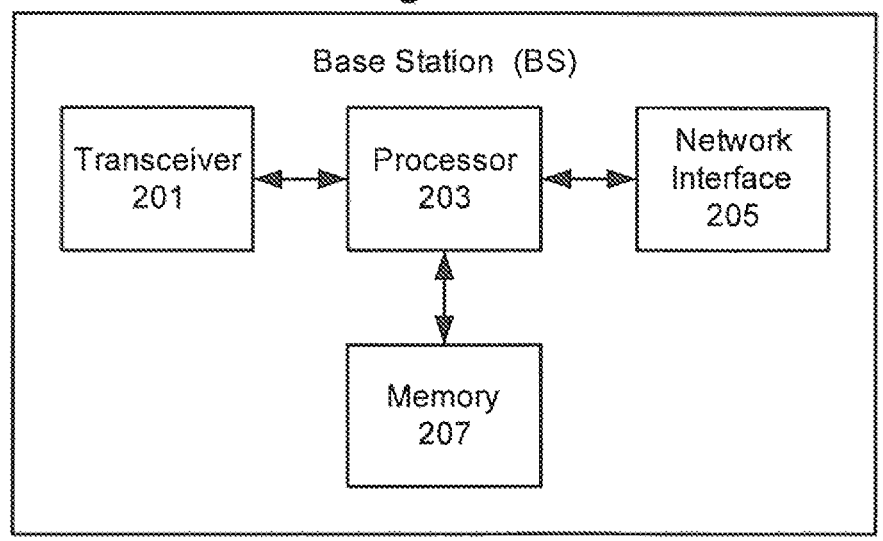
FIG. 2 is a block diagram illustrating a base station of FIG. 1.

FIG. 2 is a block diagram illustrating elements of a base station BS of FIG. 1. As shown, a base station BS may include a transceiver circuit 201 (also referred to as a transceiver or radio interface) configured to provide radio communications with a plurality of wireless terminals, a network interface circuit 205 (also referred to as a network interface) configured to provide communications with other base stations of the RAN (e.g., over the X2 interface), and a processor circuit 203 (also referred to as a processor) coupled to the transceiver circuit and the network interface circuit, and a memory circuit 207 coupled to the processor circuit. The memory circuit 207 may include computer readable program code that when executed by the processor circuit 203 causes the processor circuit to perform operations according to embodiments disclosed herein. According to other embodiments, processor circuit 203 may be defined to include memory so that a memory circuit is not separately provided.

Figure 3:
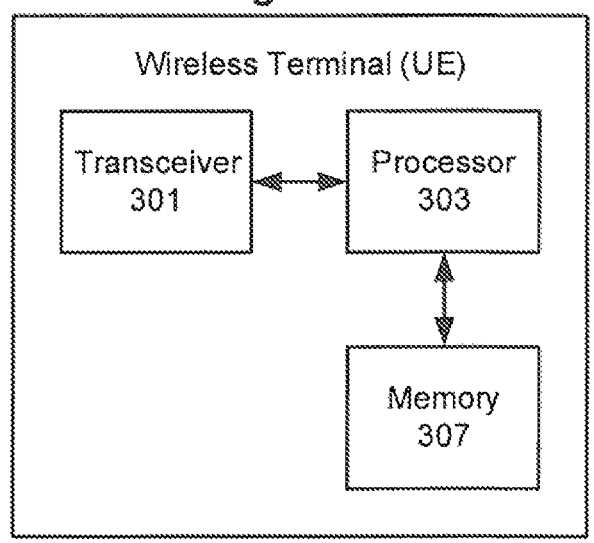
FIG. 3 is a block diagram illustrating a wireless terminal of FIG. 1.

FIG. 3 is a block diagram illustrating elements of a wireless terminal UE of FIG. 1. As shown, a wireless terminal UE may include a transceiver circuit 301 (also referred to as a transceiver) including a transmitter and a receiver configured to provide radio communications with a base station BS, a processor circuit 303 (also referred to as a processor) coupled to the transceiver circuit, and a memory circuit 307 coupled to the processor circuit. The memory circuit 307 may include computer readable program code that when executed by the processor circuit 303 causes the processor circuit to perform operations according to embodiments disclosed herein. According to other embodiments, processor circuit 303 may be defined to include memory so that a memory circuit is not separately provided.

Figure 4:
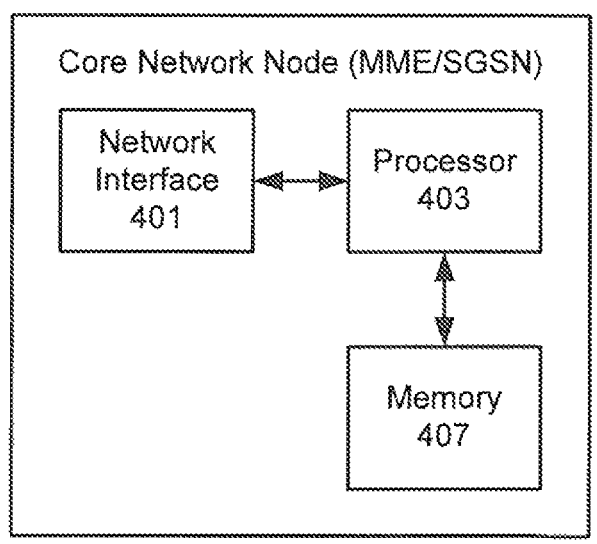
FIG. 4 is a block diagram illustrating a core network node of FIG. 1.

FIG. 4 is a block diagram illustrating elements of a core network node (e.g., an MME and/or an SGSN) of FIG. 1. As shown, a core network node may include a network interface circuit 401 (also referred to as a network interface) configured to provide communications with base stations of the RAN (e.g., over the S1 interface), a processor circuit 403 (also referred to as a processor) coupled to the network interface circuit, and a memory circuit 407 coupled to the processor circuit. The memory circuit 407 may include computer readable program code that when executed by the processor circuit 403 causes the processor circuit to perform operations according to embodiments disclosed herein. According to other embodiments, processor circuit 403 may be defined to include memory so that a memory circuit is not separately provided.

Once Active Time has been negotiated between a wireless device (e.g., an M2M device) and the network, the wireless device may apply the active time each time it moves from a Connected state (e.g., an RRC connected state) to an Idle state (e.g., an RRC idle state), even if no downlink traffic is expected. This use of the active time may result in unnecessary delay of the device transitioning to the state where the Access Stratum (AS)/radio receiver is powered off. Hence, there may be a waste of energy in the wireless device unnecessarily limiting battery lifetime.

According to some embodiments of inventive concepts, a new or existing message from the network to the wireless device may be used to indicate if Active Time shall be used or not. It may be sufficient to indicate when Active Time is not supposed to be applied when moving into Idle.

The wireless device may consume less energy because it can move into a state where the AS/radio receiver chains are turned off immediately when moving into the Idle state instead of remaining with AS/radio receiver chains turned on for the period of Active Time.

According to some embodiments of inventive concepts, a wireless device that is enabled to use PSM each time when receiving a registration accept message (e.g., a Routing Area Update RAU Accept message or Tracking Area Update TAU Accept message), will comply with the Active Time and stay Idle (monitoring for downlink network communications) with the AS/Radio receiver chains turned on for the Active Time. Hence, in case the Core Network node (e.g., MME or SGSN) is aware that there is no outstanding downlink SMS or any other message to be delivered to the wireless device (e.g., because the URRP-MME/URRP-SGSNparameter is not set), the core network node can notify the wireless device in a new Information Element (IE) in the registration accept message that the wireless device shall not apply Active Time when going into Idle state.

The FIGS. 5A, 5B, and 5C provide a table illustrating a Tracking Area Update (TAU) Accept message enhanced in the last row (of FIG. 5C) with a new Information Element, Active Time Support.

According to some embodiments of inventive concepts (option 1), the new Information Element indicates to the device if the Active Time shall be applied when the device moves into Idle state following the transaction where this TAU Accept message was received. The same change can be made to the Attach Accept and RAU Accept messages. A wireless device that receives TAU Accept, Attach Accept, or RAU Accept with this IE set so that it indicates that Active Time shall not be used, shall not apply Active Time when moved into Idle following the transaction where the TAU Accept, Attach Accept and RAU Accept messages were received. According to such embodiments, a separate indication may be required to avoid using Active Time when going to Idle state (also referred to as idle mode) after other message transactions (e.g., after User Plane data communications). FIGS. 6A, 6B, 6C, and 6D provide a table illustrating a solution for such indication.

According to some other embodiments (option 2), the new Information Element may be an indication in the TAU Accept, Attach Accept, and/or RAU Accept messages that the Active Time shall not be used by the UE (until the next TAU Accept, Attach Accept, and/or RAU Accept message in which the network may provide a new indication). According to this embodiment, the network may have the capability to hold the UE in connected mode until any outstanding downlink SMS or any other message is delivered to the UE.

FIGS. 6A, 6B, 6C, and 6D provide a table illustrating a Modified Initial UE Context Setup Request message (see, 3GPP TS 36.413 V12.3.0 entitled "Evolved Universal Terrestrial Radio Access Network (E-UTRAN) S1 Application Protocol (S1AP)") according to some embodiments of inventive concepts.

According to other embodiments of inventive concepts, a device that is enabled to use PSM may apply Active Time following some mobile originated transaction (e.g., user plane transfer when moving into Idle state (idle mode) subsequent to this mobile originated transaction). In this scenario, the MME can provide an indication to the eNB (e.g. in the S1AP UE Context Setup Request message, see 3GPP TS 36.413) that the device shall not apply Active Time (e.g., because there is no outstanding downlink transaction that could be indicated in the MME with the URRP-MMEparameter being set. The eNB will forward this indication in the RRC Connection Release message (see 3GPP TS 36.331 V12.3.0 (2014-09) entitled Evolved Universal Terrestrial Radio Access (E-UTRA); Radio Resource Control (RRC); Protocol Specification, RRCConnectionRelease) as a new IE or flag. The RRC layer in the device shall forward this information conveyed by the new IE/flag to the NAS layer. In case this information indicates that no Active Time shall be applied, then the device shall not apply Active Time when moved into Idle subsequent to the reception of this RRC Connection Release message.

Figure 7:
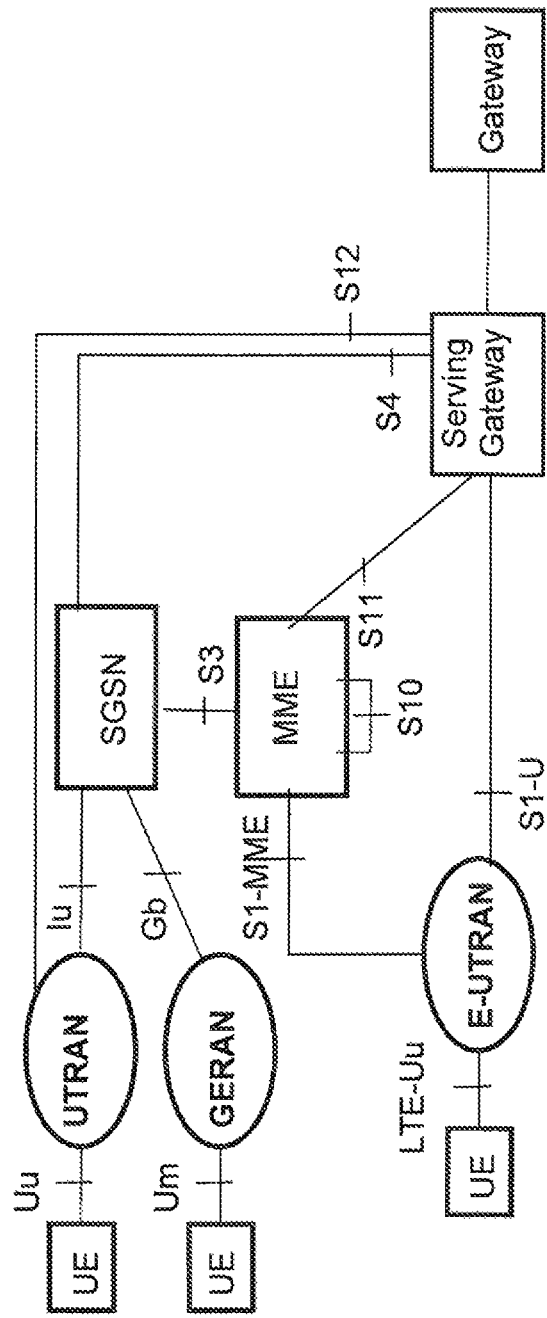
FIG. 7 is a block diagram illustrating a non-roaming architecture for 3GPP accesses according to some embodiments of inventive concepts.

FIG. 7 is a block diagram illustrating a Non-roaming architecture for 3GPP accesses using EPS. Each of UTRAN, GERAN, and E-UTRAN represents a different radio access network RAN that may be provided as discussed above with respect to FIG. 1. Each of SGSN and/or MME may be a core network node that may be provided as discussed above with respect to FIG. 1.

Embodiments of inventive concepts disclosed herein may enhance operation of a wireless device with knowledge about the need to stay in Idle state (idle mode) for the Active Time period when using PSM, and may thus reduce/avoid wasting battery lifetime when there is no need to apply Active Time.

Figure 8:
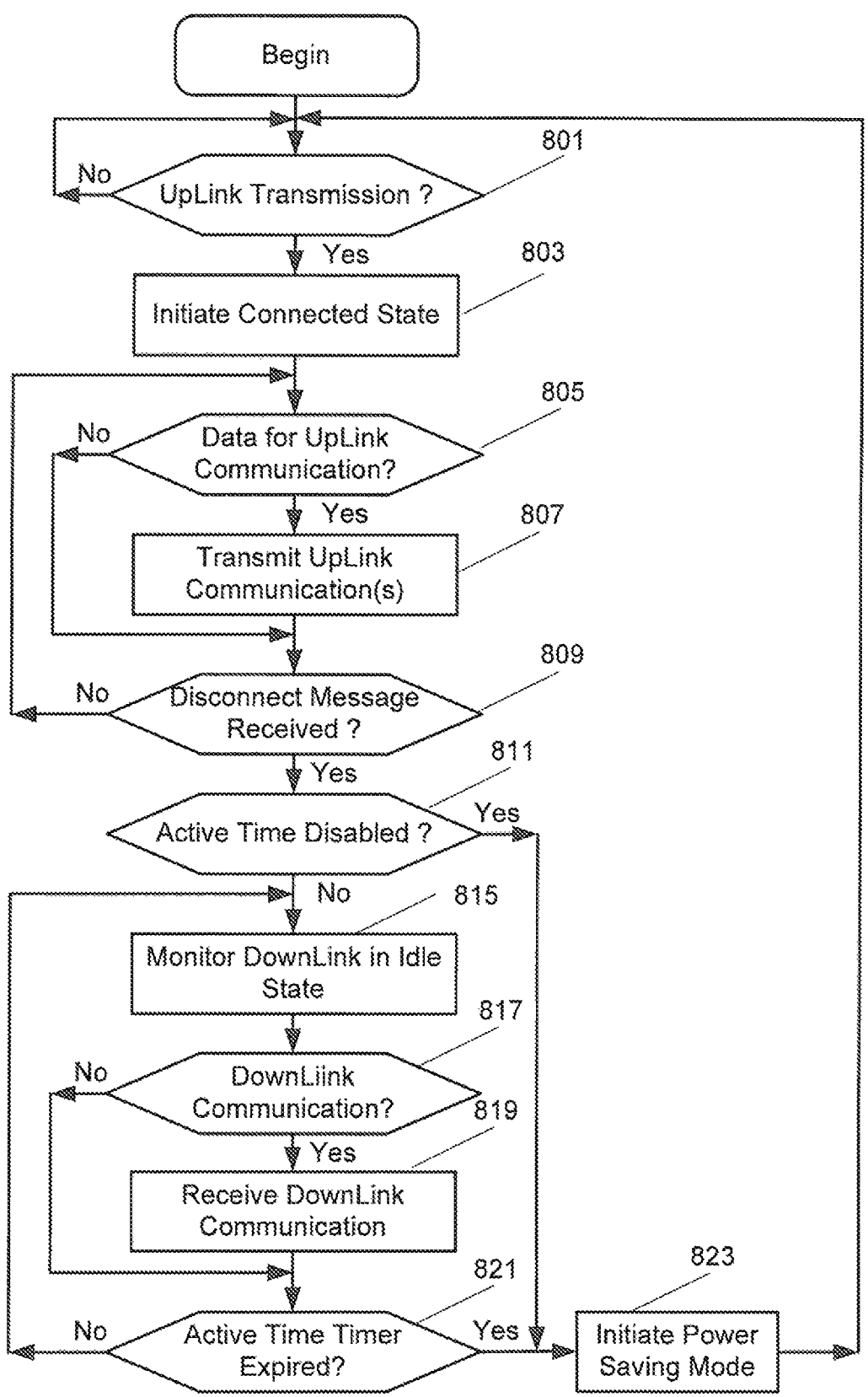
FIG. 8 is a flow chart illustrating wireless device operations according to some embodiments of inventive concepts.

FIG. 8 is a flow chart illustrating operations of wireless device processor 303. As discussed above, an active time may be received by processor 303 (through transceiver 301) defining a duration of an idle state after a connected state. At block 801, processor 303 may determine that data/communication is available for UpLink transmission. Such data/communications may be generated periodically, responsive to some event (e.g., movement to a new location), etc. Responsive to determining that data/communication is available for UpLink transmission, processor 303 may initiate a connected state (e.g., an RRC connected state) with the Radio Access Network RAN at block 803.

In the RRC connected state, processor 303 may transmit one or more uplink communications to the RAN (through transceiver 301 to a base station) at blocks 805 and/or 807. Responsive to receiving a disconnect message (through transceiver 301) at block 809, the connected state may be terminated. As discussed above, the disconnect message may either include an indication to disable monitoring of downlink transmissions in the idle state or not.

If the disconnect message includes the indication to disable monitoring of downlink transmissions in the idle state at block 811, processor 303 may initiate the power saving mode at block 823 without entering the idle state (to monitor for downlink transmissions), and/or without maintaining the idle state for a duration of the active time. For example, processor 303 may briefly enter the idle state in transition to the power saving mode (also referred to as a sleep mode).

If the disconnect message does not include the indication to disable monitoring of downlink transmissions in the idle state at block 811, processor 303 may enter the idle state at block 815 to monitor for downlink transmissions. Processor 303 may receive downlink communications (through transceiver 301) at blocks 817 and 819 in the idle state until expiration of the active time timer at block 821. The active time timer may thus determine a duration of the idle state based on the active time received from the RAN. Upon expiration of the active time timer at block 821, processor 303 may initiate the power saving mode at block 823.

Figure 9:
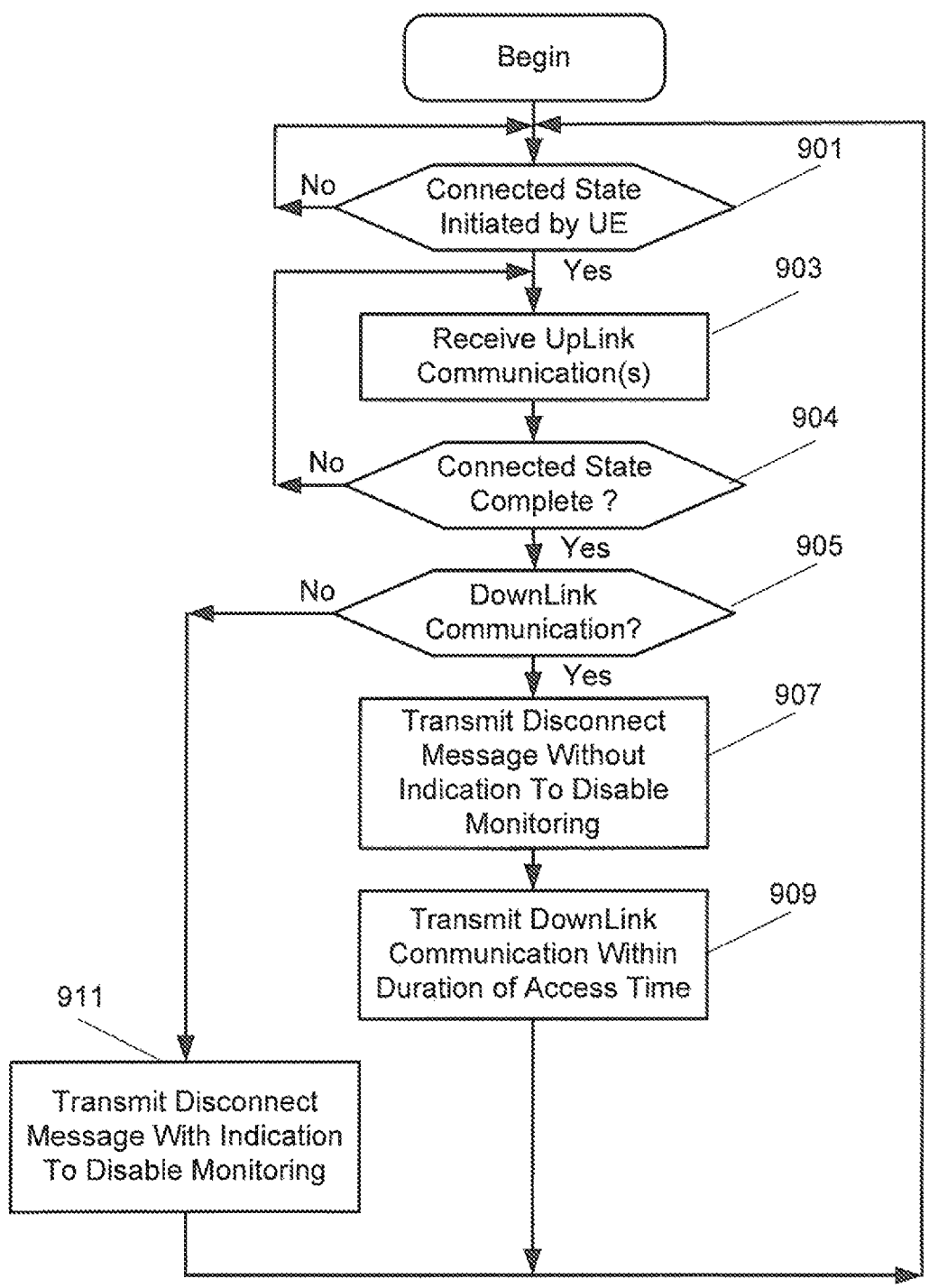
FIG. 9 is a flow chart illustrating network node operations according to some embodiments of inventive concepts.

FIG. 9 is a flow chart illustrating operations of processor 403 of a core network node and/or processor 203 of a base station. As discussed above, processor 403 of a core network node may determine the active time for the wireless device, and processor 403 may transmit the active time (defining a duration of the idle state) through network interface 401 and a base station to the wireless device. Moreover, the connected state may be initiated by the wireless device.

Once a connected state is initiated by the wireless device at block 901, processor 403 may receive uplink communications (through a base station and network interface 401) from the wireless device while in the connected state. On completion of the connected state at block 904, processor 403 may determine if downlink data/message(s)/communication(s) is/are available for the wireless device. If so at block 905, processor 405 may transmit the disconnection message (through network interface 401 and base station) to the wireless device without an indication for the wireless device to disable monitoring at block 907, and then at block 909, processor 403 may transmit one or more downlink communications (including the data/message/communication) through the network interface and base station to the wireless device (within a duration of the active time). If not at block 905, processor 403 may transmit a disconnect message with the indication to disable monitoring.

Operations of FIG. 9 may be repeated for each connected state initiated by the wireless device.

If operation of FIG. 9 are performed by base station processor 203, communications/messages may be relayed through the base station between the wireless device and the core network node. Disconnect messages provided at RAU accept messages, TAU accept messages, and attach accept messages may be initiated by the core network node and relayed through the base station. Other disconnect messages generated by core network node (e.g., an S1AP UE Context Setup Request message including an indication to disable idle state monitoring) may be received by the base station processor to trigger a the processor 203 to generate a second message (e.g., an RRC Connection Release message including an indication to disable idle state monitoring) that is transmitted to the wireless device.

Example Embodiments

Examples of embodiments of inventive concepts are discussed below with reference to the figures. Reference numbers are provided only as examples without limiting the scope of claims supported by these embodiments.

Embodiment 1. A method of operating a wireless device (UE) in a radio access network, wherein an active time is defined for monitoring of downlink transmissions in an idle state following a connected state, the method comprising: providing wireless communication (803, 807) with the radio access network in a connected state; receiving a disconnect message (809) including an indication to disable monitoring of downlink transmissions in the idle state; and responsive to receiving the disconnect message including the indication to disable monitoring of downlink transmissions in the idle state, initiating (823) a power saving mode for the wireless device without waiting a duration of the active time after receiving the disconnect message.

Embodiment 2. The method of Embodiment 1 wherein the connected state is a first connected state, and wherein the disconnect message is a first disconnect message, the method further comprising: providing wireless communication (803, 807) with the radio access network in a second connected state; receiving a second disconnect message (809) without an indication to disable monitoring of downlink transmissions in the idle state; and responsive to receiving the second disconnect message, monitoring (815) for downlink communications from the radio access network in an idle state for a duration of the active time after receiving the second disconnect message; and responsive to expiration of the duration of the active time, initiating (823) the power saving mode for the wireless device.

Embodiment 3. The method of Embodiment 2 wherein providing wireless communication with the radio access network in the second connected state comprises providing wireless communication with the radio access network in the second connected state after initiating the power saving mode.

Embodiment 4. The method of any of Embodiments 2-3 wherein the first and second connected states comprise respective first and second Radio Resource Control, RRC, connected states.

Embodiment 5. The method of any of Embodiments 2-4 wherein the idle state comprises a Radio Resource Control, RRC, idle state.

Embodiment 6. The method of any of Embodiments 2-5 wherein monitoring for downlink transmissions in the idle state comprises monitoring with an access stratum, AS, radio receiver chain of the wireless device turned on, and wherein initiating the power saving mode comprises turning the access stratum radio receiver chain of the wireless device off.

Embodiment 7. The method of any of Embodiments 1-6 wherein initiating the power saving mode without waiting a duration of the active time comprises turning off an access stratum, AS, receiver chain of the wireless device.

Embodiment 8. The method of any of Embodiments 1-7 wherein initiating the power saving mode without waiting a duration of the active time comprises turning off an access stratum, AS, receiver chain of the wireless device immediately.

Embodiment 9. The method of any of Embodiments 1-8 wherein the disconnect message comprises a Routing Area Update, RAU, accept message including the indication to disable monitoring of downlink transmissions as an Active Time Support Information Element, IE.

Embodiment 10. The method of any of Embodiments 1-8 wherein the disconnect message comprises a Tracking Area Update, TAU, accept message including the indication to disable monitoring of downlink transmissions as an Active Time Support Information Element, IE.

Embodiment 11. The method of any of Embodiments 1-8 wherein the disconnect message comprises an Attach Accept message including the indication to disable monitoring of downlink transmissions as an Active Time Support Information Element, IE.

Embodiment 12. The method of any of Embodiments 1-8 wherein the disconnect message comprises a Radio Resource Control, RRC, Connection Release message including the indication to disable monitoring of downlink transmissions as an Active Time Support Information Element, IE.

Embodiment 13. The method of any of Embodiments 1-12 wherein initiating the power saving mode comprises switching a receiver of the wireless device off.

Embodiment 14. The method of any of Embodiments 1-13 wherein the disconnect message is received while in the connected state.

Embodiment 15. The method of any of Embodiments 1-14 wherein the connected state is a Radio Resource Control, RRC, connected state.

Embodiment 16. A method of any of Embodiments 1-15 further comprising:
receiving the active time from the radio access network.

Embodiment 17. A wireless device (UE) wherein the wireless device is adapted to perform according to any of embodiments 1-16.

Embodiment 18. A wireless device (UE) comprising: a transceiver (301) including a transmitter and receiver configured to provide wireless communications between the wireless device (UE) and a radio access network; and a processor (303) coupled with the transceiver (301), wherein the processor (303) is configured to perform methods according to any of Embodiments 1-16, wherein communications with the radio access network are provided through the transceiver (301).

Embodiment 19. A method of operating a node of a communication network providing communication service for a wireless device (UE), the method comprising: providing wireless communication (901, 903) with the wireless device in a connected state; and transmitting (911) a disconnect message for the wireless device wherein the disconnect message includes an indication for the wireless device to disable monitoring of downlink transmissions in an idle state.

Embodiment 20. The method of Embodiment 19 wherein the connected state is a first connected state, and wherein the disconnect message is a first disconnect message, the method further comprising: providing wireless communication (901, 903) with the wireless device in a second connected state; transmitting (907) a second disconnect message to the wireless device wherein the second disconnect message is without an indication for the wireless device to disable monitoring; and after transmitting the second disconnect message, transmitting a downlink communication to the wireless terminal within an active time defined for the wireless device to monitor downlink transmission in an idle state following a connected state.

Embodiment 21. The method of Embodiment 20 wherein providing wireless communication in the second connected state comprises providing wireless communication in the second connected state after transmitting the first disconnect message.

Embodiment 22. The method of any of Embodiments 20-21 wherein the first and second connected states comprises respective first and second Radio Resource Control, RRC, connected states.

Embodiment 23. The method of any of Embodiments 19-22 wherein the idle state comprises a Radio Resource Control, RRC, idle state.

Embodiment 24. The method of any of Embodiments 19-22 wherein the disconnect message comprises a Routing Area Update, RAU, accept message including the indication to disable monitoring of downlink transmissions as an Active Time Support Information Element, IE.

Embodiment 25. The method of any of Embodiments 19-22 wherein the disconnect message comprises a Tracking Area Update, TAU, accept message including the indication to disable monitoring of downlink transmissions as an Active Time Support Information Element, IE.

Embodiment 26. The method of any of Embodiments 19-22 wherein the disconnect message comprises an Attach Accept message including the indication to disable monitoring of downlink transmissions as an Active Time Support Information Element, IE.

Embodiment 27. The method of any of Embodiments 19-26 wherein the node comprises a core network node, wherein the core network node is coupled with the wireless device through a base station, and wherein the disconnect message is transmitted from the core network node through the base station to the wireless device.

Embodiment 28. The method of any of Embodiments 19-22 wherein the disconnect message comprises an S1AP UE Context Setup Request message including an indication for the wireless device to disable monitoring of downlink transmissions in an idle state.

Embodiment 29. The method of Embodiment 28, wherein the node comprises a core network node, wherein the core network node is coupled with the wireless device through a base station, and wherein the S1AP UE Context Setup Request message including the indication for the wireless device to disable monitoring is transmitted from the core network node to the base station.

Embodiment 30. The method of any of embodiments 19-22, wherein the node comprises a base station, and wherein transmitting the disconnect message comprises, receiving an S1AP UE Context Setup Request message with an indication for the wireless device to disable monitoring is transmitted from a core network node, and responsive to receiving the S1AP UE Context Setup Request Message, transmitting a Radio Resource Control, RRC, Connection Release message to the wireless device with an indication for the wireless device to disable monitoring.

Embodiment 31. The method of any of embodiments 19-22, wherein the node comprises a base station, and wherein transmitting the disconnect message comprises, receiving a first message from a core network node with an indication for the wireless device to disable monitoring, and responsive to receiving the first message from the core network node, transmitting a second message to the wireless device with an indication for the wireless device to disable monitoring.

Embodiment 32. The method of any of Embodiments 19-31 wherein the disconnect message is transmitted while in the connected state.

Embodiment 33. The method of any of Embodiments 19-32 wherein the disconnect message is transmitted to the wireless device while in the connected state.

Embodiment 34. The method of any of Embodiments 19-33 wherein the connected state is a Radio Resource Control, RRC, Connected state.

Embodiment 35. The method of any of Embodiments 19-34 further comprising: before transmitting the disconnect message, transmitting an active time to the wireless device wherein the active time defines a duration of monitoring for downlink communications in an idle state.

Embodiment 36. A node of a communication network wherein the node is adapted to perform according to any of Embodiments 19-35.

Embodiment 37. A core network comprising: a network interface configured to provide communication between the core network node and a base station of a radio access network; and a processor coupled with the network interface, wherein the processor is configured to perform according to methods of any of Embodiments 19-29 and 32-35, wherein communications with the base station are provided through the network interface.

Embodiment 38. A base station comprising: a network interface configured to provide communication between the base station and a core network node; a transceiver configured to provide communication between the base station and the wireless device; and a processor coupled with the network interface and the transceiver, wherein the processor is configured to perform according to methods of any of Embodiments 19-26 and 30-35, wherein communications with the core network node are provided through the network interface and wherein communications with the wireless device are provided through the transceiver.

ABBREVIATIONS

3GPP Third Generation Partnership Program
BSC Base Station Controller
CN Core Network
GPRS General Packet Radio Service
LA Location Area
MSC Mobile Switching Center
MME Mobility Management Entity
NW Network
RA Routing Area
RAN Radio Access Network
RAT Radio Access Technology
RNC Radio Network Controller
SGSN Serving GPRS Support Node
TA Tracking Area
UE User Equipment
URRP-MME UE Reachability Request Parameter for MME
URRP-SGSN UE Reachability Request Parameter for SGSN
GPRS General Packet Radio Services
TAU Tracking Area Update
RAU Routing Area Update
UMTS Universal Mobile Telecommunications System
UTRAN UMTS Terrestrial Radio Access Network
GSM Global System for Mobile Communications
EDGE Enhanced Data rates for GSM Evolution
GERAN GSM EDGE Radio Access Network
E-UTRAN Evolved UTRAN The disclosures of the following references are hereby incorporated herein in their entireties by reference.
23.682: http://www.3gpp.org/DynaReport/23682.htm
23.401: http://www.3gpp.org/DynaReport/23401.htm
23.060: http://www.3gpp.org/DynaReport/23060.htm
36.331: http://www.3gpp.org/DynaReport/36331.htm
Further Definitions:

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows. Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

That which is claimed is:

1. A method of operating a wireless device (UE) in a radio access network, wherein an active time is defined for monitoring of downlink transmissions in an idle state following a connected state, the method comprising:
   providing wireless communication with the radio access network in a first connected state;
   receiving a first disconnect message including an indication to disable monitoring of downlink transmissions in the idle state;
   responsive to receiving the first disconnect message including the indication to disable monitoring of downlink transmissions in the idle state, initiating a power saving mode for the wireless device without waiting a duration of the active time after receiving the first disconnect message, wherein initiating the power saving mode disables monitoring of downlink transmissions in the idle state;
   providing wireless communication with the radio access network in a second connected state;
   receiving a second disconnect message without an indication to disable monitoring of downlink transmissions in the idle state; and
   responsive to receiving the second disconnect message, monitoring for downlink communications from the radio access network in the idle state for a duration of the active time after receiving the second disconnect message; and
   responsive to expiration of the duration of the active time, initiating the power saving mode for the wireless device.

2. The method of claim 1, wherein providing wireless communication with the radio access network in the second connected state comprises providing wireless communication with the radio access network in the second connected state after initiating the power saving mode.

3. The method of claim 1, wherein the first and second connected states comprise respective first and second Radio Resource Control (RRC) connected states.

4. The method of claim 1, wherein the idle state comprises a Radio Resource Control (RRC) idle state.

5. The method of claim 1, wherein monitoring for downlink transmissions in the idle state comprises monitoring with an access stratum (AS) radio receiver chain of the wireless device turned on, and wherein initiating the power saving mode comprises turning the access stratum radio receiver chain of the wireless device off.

6. The method of claim 1, wherein initiating the power saving mode without waiting a duration of the active time comprises turning off an access stratum (AS) receiver chain of the wireless device.

7. The method of claim 1, wherein initiating the power saving mode without waiting a duration of the active time comprises turning off an access stratum (AS) receiver chain of the wireless device immediately.

8. The method of claim 1, wherein the first disconnect message comprises a Routing Area Update (RAU) accept message including the indication to disable monitoring of downlink transmissions as an Active Time Support Information Element (IE).

9. The method of claim 1, wherein the first disconnect message comprises a Tracking Area Update (TAU) accept message including the indication to disable monitoring of downlink transmissions as an Active Time Support Information Element (IE).

10. The method of claim 1, wherein the first disconnect message comprises an Attach Accept message including the indication to disable monitoring of downlink transmissions as an Active Time Support Information Element (IE).

11. The method of claim 1, wherein the first disconnect message comprises a Radio Resource Control (RRC) Connection Release message including the indication to disable monitoring of downlink transmissions as an Active Time Support Information Element (IE).

12. The method of claim 1, wherein initiating the power saving mode comprises switching a receiver of the wireless device off.

13. The method of claim 1, wherein the first disconnect message is received while in the first connected state.

14. The method of claim 1, wherein the first connected state is a Radio Resource Control (RRC) connected state.

15. The method of claim 1, further comprising:
receiving the active time from the radio access network.

16. A wireless device (UE) configured to operate in a radio access network, wherein an active time is defined for monitoring of downlink transmissions in an idle state following a connected state, the wireless device (UE) comprising:
a transceiver including a transmitter and receiver configured to provide wireless communications between the wireless device (UE) and a radio access network; and
a processor coupled with the transceiver, wherein the processor is configured to,
provide wireless communication with the radio access network through the transceiver in a first connected state,
receive a first disconnect message through the transceiver, wherein the first disconnect message includes an indication to disable monitoring of downlink transmissions in the idle state,
initiate a power saving mode for the wireless device without waiting a duration of the active time after receiving the first disconnect message responsive to receiving the first disconnect message including the indication to disable monitoring of downlink transmissions in the idle state, wherein initiating the power saving mode disables monitoring of downlink transmissions in the idle state;
provide wireless communication with the radio access network in a second connected state;
receive a second disconnect message without an indication to disable monitoring of downlink transmissions in the idle state; and
monitor for downlink communications from the radio access network in the idle state for a duration of the active time responsive to receiving the second disconnect message after receiving the second disconnect message; and
responsive to expiration of the duration of the active time, initiate the power saving mode for the wireless device.

17. The wireless device of claim 16, wherein providing wireless communication with the radio access network in the second connected state comprises providing wireless communication with the radio access network in the second connected state after initiating the power saving mode.

18. The wireless device of claim 16, wherein monitoring for downlink transmissions in the idle state comprises monitoring with an access stratum (AS) radio receiver chain of the wireless device turned on, and wherein initiating the power saving mode comprises turning the access stratum radio receiver chain of the wireless device off.

19. The wireless device of claim 16, wherein initiating the power saving mode without waiting a duration of the active time comprises turning off an access stratum (AS) receiver chain of the wireless device.

20. A method of operating a node of a communication network providing communication service for a wireless device (UE), the method comprising:
providing wireless communication with the wireless device in a connected state; and
transmitting a disconnect message for the wireless device wherein the disconnect message includes an indication for the wireless device to disable monitoring of downlink transmissions in an idle state;
wherein the connected state is a first connected state, and wherein the disconnect message is a first disconnect message, the method further comprising:
providing wireless communication with the wireless device in a second connected state;
transmitting a second disconnect message to the wireless device wherein the second disconnect message is without an indication for the wireless device to disable monitoring; and,
after transmitting the second disconnect message, transmitting a downlink communication to the wireless terminal within an active time defined for the wireless device to monitor downlink transmission in an idle state following a connected state.

21. The method of claim 20, wherein providing wireless communication in the second connected state comprises providing wireless communication in the second connected state after transmitting the first disconnect message.

22. The method of claim 20, wherein the first and second connected states comprise respective first and second Radio Resource Control (RRC) connected states.

23. The method of claim 20, wherein the idle state comprises a Radio Resource Control (RRC) idle state.

24. The method of claim 20, wherein the disconnect message comprises a Routing Area Update (RAU) accept message including the indication to disable monitoring of downlink transmissions as an Active Time Support Information Element (IE).

25. The method of claim 20, wherein the disconnect message comprises a Tracking Area Update (TAU) accept message including the indication to disable monitoring of downlink transmissions as an Active Time Support Information Element (IE).

26. The method of claim 20, wherein the disconnect message comprises an Attach Accept message including the indication to disable monitoring of downlink transmissions as an Active Time Support Information Element (IE).

27. The method of claim 20, wherein the node comprises a core network node, wherein the core network node is coupled with the wireless device through a base station, and wherein the disconnect message is transmitted from the core network node through the base station to the wireless device.

28. The method of claim 20, wherein the disconnect message comprises an S1AP UE Context Setup Request message including an indication for the wireless device to disable monitoring of downlink transmissions in an idle state.

29. The method of claim 28, wherein the node comprises a core network node, wherein the core network node is coupled with the wireless device through a base station, and wherein the S1AP UE Context Setup Request message including the indication for the wireless device to disable monitoring is transmitted from the core network node to the base station.

30. The method of claim 20, wherein the node comprises a base station, and wherein transmitting the disconnect message comprises,
   receiving an S1AP UE Context Setup Request message with an indication for the wireless device to disable monitoring wherein the S1AP UE Context Setup Request message is received from a core network node, and
   responsive to receiving the S1AP UE Context Setup Request Message, transmitting a Radio Resource Control (RRC) Connection Release message to the wireless device with an indication for the wireless device to disable monitoring.

31. The method of claim 25, wherein the node comprises a base station, and wherein transmitting the disconnect message comprises:
   receiving a first message from a core network node with an indication for the wireless device to disable monitoring, and
   responsive to receiving the first message from the core network node, transmitting a second message to the wireless device with an indication for the wireless device to disable monitoring.

32. The method of claim 20, wherein the disconnect message is transmitted while in the connected state.

33. The method of claim 20, wherein the connected state is a Radio Resource Control (RRC) Connected state.

34. The method of claim 20, further comprising:
   before transmitting the disconnect message, transmitting an active time to the wireless device wherein the active time defines a duration of monitoring for downlink communications in an idle state.

35. A node of a communication network configured to provide communication service for a wireless device (UE), wherein the node comprises:
   a communication interface circuit; and
   a processor, wherein the processor is configured to:
      provide wireless communication with the wireless device in a connected state, via the communication interface circuit; and
      transmit a disconnect message for the wireless device, via the communication interface circuit, wherein the disconnect message includes an indication for the wireless device to disable monitoring of downlink transmissions in an idle state;
   wherein the connected state is a first connected state, and wherein the disconnect message is a first disconnect message, and wherein the processor is further configured to:
      provide wireless communication with the wireless device in a second connected state;
      transmit a second disconnect message to the wireless device wherein the second disconnect message is without an indication for the wireless device to disable monitoring; and,
      after transmitting the second disconnect message, transmit a downlink communication to the wireless terminal within an active time defined for the wireless device to monitor downlink transmission in an idle state following a connected state.

36. The node of claim 35, wherein providing wireless communication in the second connected state comprises providing wireless communication in the second connected state after transmitting the first disconnect message.

37. The node of claim 35, wherein the node comprises a core network node, wherein the core network node is coupled with the wireless device through a base station, and wherein the disconnect message is transmitted from the core network node through the base station to the wireless device.

38. The node of claim 35, wherein the disconnect message comprises an S1AP UE Context Setup Request message including an indication for the wireless device to disable monitoring of downlink transmissions in an idle state.

39. The node of claim 38, wherein the node comprises a core network node, wherein the core network node is coupled with the wireless device through a base station, and wherein the S1AP UE Context Setup Request message including the indication for the wireless device to disable monitoring is transmitted from the core network node to the base station.

40. The node of claim 35, wherein the node is a core network node of a communication network providing communication service for a wireless device (UE), and wherein the communication interface circuit is a network interface configured to provide communication between the core network node and a base station of a radio access network.

41. The node of claim 35, wherein the node is a base station of a communication network providing communication service for a wireless device (UE), and wherein the communication interface circuit is a transceiver configured to provide communication between the base station and the wireless device.

* * * * *